US010876011B2

(12) United States Patent
Khavari (10) Patent No.: US 10,876,011 B2
(45) Date of Patent: Dec. 29, 2020

(54) INKJET INKS (71) Applicant: HEWLETT-PACKARD DEVELOPMENT COMPANY, L.P., Houston, TX (US)

(72) Inventor: Mehrgan Khavari, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/309,851

(22) PCT Filed: Oct. 21, 2016

(86) PCT No.: PCT/US2016/058122
§ 371 (c)(1),
(2) Date: Dec. 13, 2018

(87) PCT Pub. No.: WO2018/075065
PCT Pub. Date: Apr. 26, 2018

(65) Prior Publication Data
US 2019/0194483 A1 Jun. 27, 2019

(51) Int. Cl.
C09D 11/00 (2014.01)
C09D 11/328 (2014.01)
C09D 11/36 (2014.01)
D06P 3/79 (2006.01)
C09D 11/38 (2014.01)
C09D 11/102 (2014.01)
C09D 11/104 (2014.01)
C09D 11/106 (2014.01)
D06P 5/30 (2006.01)

(52) U.S. Cl.
CPC .......... C09D 11/328 (2013.01); C09D 11/102 (2013.01); C09D 11/104 (2013.01); C09D 11/106 (2013.01); C09D 11/36 (2013.01); C09D 11/38 (2013.01); D06P 3/79 (2013.01); D06P 5/30 (2013.01)

(58) Field of Classification Search
CPC ....... C09D 11/36; C09D 11/328; C09D 11/38; D06P 3/79; D06P 5/30
See application file for complete search history.

(56) References Cited

U.S. PATENT DOCUMENTS

| 7,278,728 | B2 | 10/2007 | Desie et al. |
| 9,296,910 | B2 | 3/2016 | Brown et al. |
| 2008/0006175 | A1 | 1/2008 | King et al. |
| 2010/0068476 | A1* | 3/2010 | Jeremic ............... C09D 11/101 428/195.1 |
| 2012/0249705 | A1 | 10/2012 | Aoki et al. |
| 2013/0260037 | A1* | 10/2013 | Paiz ..................... C09D 11/106 427/256 |

(Continued)

FOREIGN PATENT DOCUMENTS

| CN | 105504996 A | 4/2016 |
| JP | H11323228 A | 11/1999 |

(Continued)

Primary Examiner — Bijan Ahvazi
(74) Attorney, Agent, or Firm — Fabian VanCott (57) ABSTRACT An inkjet ink including: a solvent; a solvent-soluble dye; 0.1 wt. % to 1 wt. % of the ink of a perfluoropolyether; and 0.1 wt. % to 2 wt. % of the ink of a polymeric surfactant, wherein the polymeric surfactant comprises an alkyl domain.

18 Claims, 2 Drawing Sheets (56) References Cited

U.S. PATENT DOCUMENTS

| | | | |
|---|---|---|---|
| 2013/0327247 A1* | 12/2013 | Khavari | C09D 11/328 106/31.43 |
| 2015/0109390 A1 | 4/2015 | Selmeczy et al. | |
| 2015/0148469 A1 | 5/2015 | Kiyomoto et al. | |
| 2017/0002217 A1* | 1/2017 | Zhu | C09D 11/16 |

FOREIGN PATENT DOCUMENTS

| | | | |
|---|---|---|---|
| WO | WO-2009035158 | 3/2009 | |
| WO | WO-2012121700 | 9/2012 | |
| WO | WO-2013015813 | 1/2013 | |
| WO | WO-2017067610 A1 * | 4/2017 | B41M 1/305 |

\* cited by examiner

INKJET INKS

BACKGROUND

Inkjet printing is a versatile method for recording images on various media surfaces for a number of reasons, including low cost, low printer noise, capability for high speed printing, and multicolor recording. Inkjet printing can deposit a variety of ink types including pigment based aqueous inks and dye based solvent inks. Dye based solvent inks can be particularly useful for ink jet printing on nonporous substrates. The interaction of the deposited ink and the media impacts the output of the printed material. Poor adhesion, coalescence, smearing, and discoloration may occur if the ink formulations and the media are incompatible.

DETAILED DESCRIPTION

Inkjet printing involves forcing ink droplets out of a nozzle with controlled timing, velocity, and direction. The ink droplets impact the substrate and the carrier fluid is absorbed or evaporates to leave the colorant on the substrate, forming an image. When the nozzle is not in use, evaporation of the carrier fluid from the nozzle can result in the accumulation of ink solids in the nozzle. This accumulation may interfere with the proper functioning of the nozzle. In some instances, the accumulated residue may plug the nozzle.

The ejected droplets also interact with the substrate. Substrates have various properties that impact the behavior of deposited droplets. Some substrates are porous, for example, paper. Paper may be formed of a sheet of interlocking fibers. The gaps between the fibers encourage droplets deposited on the surface to infiltrate into the paper. This reduces the free energy of the system.

The free energy of a droplet-substrate system may be modeled by summing: the surface energy of the surface x the exposed surface area of the surface+the surface area of the printing fluid x the exposed surface area of the fluid+the interfacial energy of the surface-fluid x the contact area between the printing fluid and the surface. Entropy encourages the system to shift towards lower free energy states.

Paper surfaces tend to have relatively high surface area per unit of area due to the fibers. Further, the fibers themselves are relatively high energy due to the presence of cellulose and similar materials with exposed polar groups. In contrast, some substrates have relatively low surface areas and low surface energies, for example, polyolefin sheet material. Plastic sheets are generally a solid layer of material rather than a collection of fibers. Thus, the surface area of a plastic sheet per unit of area is much lower than that found on high area surfaces like paper. This low surface area provides less surface area that can be covered by a fluid to reduce the system energy.

Further, polyolefin surfaces have relatively low surface energy due to the material forming the surface. Polyolefin surfaces are composed of long, alkyl polymer chains. These chains have a highly uniform potential with minimal polarity. This produces a surface with relatively low surface energy.

One approach to modify the wettability of polyolefin surfaces is to expose them to plasma, flame, or corona discharge in the presence of oxygen. This results in the addition of oxygen containing groups into the polymer. The oxygen may form, for example, hydroxyl, ether, carboxylic, or ketone groups in the polymer. The presence of oxygen containing groups on the surface increases the surface energy of the polyolefin. The higher surface energy increases wetting and increases the adhesion of species that are able to couple with the oxygen containing groups on the surface of the polyolefin.

However, maintaining oxygen containing species on the surface of a polyolefin has challenges when applied to printing media. A polyolefin is generally above its glass transition temperature ($T_g$) at service or storage temperature. Accordingly, the chains of the polyolefin are mobile and engaged in reorganization. As a practical matter, the newly formed oxygenated surface of the polyolefin material will be absorbed into the polymer and replaced with lower energy, unmodified hydrocarbon chains over time. The time frame for this reorganization depends on a number of factors including: storage conditions, the particular polyolefin, the density of oxygen species formed on the surface, and the distribution of chain weights in the polymer. One rule of thumb is that much of the benefit of the surface modification is lost at 24 hours and that any process designed to take advantage of the oxygenated polyolefin surface should be performed within 8 hours.

These limitations and especially the short time between plasma exposure and applying a printing fluid make this approach to increasing wetting of polyolefin surfaces a challenge. Additional challenges include the difficulty of getting a uniform plasma field over a large polyolefin surface, for example, over a material used for a banner. Similarly, the instability of the modified polyolefin surface makes storage and distribution more expensive. Having a printing media that is not shelf stable may impede customer adoption.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the example is included in at least that one example, but not necessarily in other examples. The various instances of the phrase "in one example" or similar phrases in various places in the specification are not necessarily all referring to the same example.

Concentrations, amounts, and other numerical data may be presented herein in a range format. The range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of 1 wt. % to 20 wt. % should be interpreted to include not only the explicitly recited concentration limits of 1 wt, % to 20 wt. %, but also to include individual concentrations such as 2 wt. %, 3 wt. %, 4 wt. %, and sub-ranges such as 5 wt. % to 15 wt. %, 10 wt. % to 20 wt. %, etc.

All expressed concentrations in this specification and the associated claims are in terms of the formulated ink unless otherwise stated. For example, a statement that the ink comprises 50 wt. % to 98 wt. % solvent is on a formulated ink basis. All expressed concentrations are on a weight percentage (wt. %) or parts per million (ppm) of ink basis at standard temperature and pressure (STP) unless otherwise stated.

Printing fluids, or inks, include a solvent and a colorant. The colorant may include dye and/or pigment. The solvent solubilizes the colorant and upon evaporation the colorant remains on the substrate to provide the printing or pattern desired.

Solvents include a wide variety of chemical species and include: water: alcohols, and non-alcohol organic solvents. Each solvent may interact differently with a substrate. Substrates may be categorized by their energy, roughness, porosity, and/or other properties. If a solvent has higher surface energy than the substrate, the solvent will tend to be repelled by the surface. For example, if the surface is a polyolefin with a low surface energy, then deposited inks will tend to bead up rather than spread.

The addition of a polymeric surfactant may increase the spreading of inks a polyolefin surface. The polymeric surfactant increases wetting using two related phenomena. First, the polymeric surfactant lowers the surface energy of the ink droplet. Second, the polymeric surfactant lowers the interfacial energy between the polyolefin surface and the ink droplet. These reductions in energy encourage the ink to spread on the polyolefin surface rather than beading up.

For the purposes of this specification and the associated claims, a polymeric surfactant is a polymeric material with an alkyl domain and a solvent soluble domain that lowers the interfacial energy between the ink and a polyolefin surface.

For purposes of this specification and the associated claims, a polyolefin is a polymer whose surface comprises predominately alkane (alkyl) chains. Some examples of homogenous polymers that meet this definition include: polyethylene (PE), low density polyethylene (LDPE), linear low density polyethylene (LLDPE), high density polyethylene (HDPE), polypropylene (PP), oriented polypropylene (OPP), biaxially oriented polypropylene (BOPP), polymethylpentene (PMP), polybutene-1 (PB-1), polyisobutylene (FIB), ethylene propylene rubber (EPR), ethylene propylene diene monomer (M-class) rubber (EPDM rubber).

Another example is a block copolymers include both an alkane segment and a second segment that is below glass transition temperature ($T_g$) of the second segment at service temperature. The glassy blocks of the second segment may tend to form crosslinks within the bulk of the polymer; however, the surface of the block polymer will be predominantly composed of the alkyl segments due to their lower surface energy and relative mobility. Similarly, more structurally complex polymer forms that include a mobile alkyl segment that may preferentially occupy the surface meet the provided definition. An example of such a polymer is a brush or comb polymer with alkyl pendent groups. While a comb polymer has pendent groups of with a first functionality, a brush polymer has pendant groups from the same backbone atoms with different functionalities. For example, a brush polymer may have a silicone backbone with alternating silicon and oxygen atoms, where some of the silicon backbone atoms have both an alkyl chain and a polyether chain independently attached to same silicon atom (or any two pendant groups with different functionalities).

The polyolefin may be a homogenous or heterogeneous material. The polyolefin may be a layer or coating of a suitable polyolefin over a substrate, for example, polyethylene over paper. Such composite constructions may have lower costs, better mechanical properties, or other benefits over pure polyolefin sheet material.

Inkjet inks have challenges with deposition onto unmodified polyolefin surfaces. Unmodified polyolefin surfaces, for example, polyethylene and polypropylene based surfaces, have low surface energy which tends to repel printing fluids with higher surface energies. Investigation has found some polymeric surfactants which reduce the interfacial energy between the hydrophobic polymer surface and an alcohol based ink droplet and produce enhanced, controlled spreading on the polyolefin surface. This discovery enables the use of alcohol based inks for printing onto low energy polyolefin surfaces. Alcohol based inks may have faster drying times than, for example, water based inks.

Among other examples, this specification describes an inkjet ink including: a solvent; a solvent-soluble dye; 0.1 wt. % to 1 wt. % of the ink of a perfluoropolyether; and 0.1 wt, % to 2 wt. % of the ink of a polymeric surfactant, wherein the polymeric surfactant comprises an alkyl domain.

Among other examples, this specification also describes an inkjet ink including: 50 wt. % to 98 wt. % of the ink of an alcohol solvent; a dye soluble in the alcohol solvent; 0.1 wt. % to 1 wt. % of the ink of a perfluoropolyether; and 0.1 wt. % to 2 wt. % of the ink of a non-water soluble polymeric surfactant, wherein the ink comprises no more than 1 wt. % water.

This specification also describes a method of printing onto a polyolefin surface, the method including: depositing an ink onto a polyolefin surface, wherein the ink includes: a solvent; a solvent-soluble dye: a perfluoropolyether comprising 0.1 wt, % to 1 wt. % of the ink; and a polymeric surfactant, the polymeric surfactant comprising 0.1 wt. % to 2 wt. % of the ink.

The ink includes a solvent, a colorant; a perfluoropolyether; and a polymeric surfactant. The ink may also include other components, for example, cosolvent(s), non-polymeric surfactant(s), non-perfluoropolyether anti-kogation agent(s), and/or jettability additive(s). In some examples disclosed herein, the ink vehicle of the inkjet ink may include antimicrobial agent(s), biocide(s), viscosity modifier(s), and material for pH adjustment, sequestering agent, preservative, and the like.

The inclusion of a polymeric surfactant has been found to increase the wetting of the printed ink. This is particularly useful when the ink is deposited onto a polyolefin.

POLYMERIC SURFACTANT: A variety of materials have been found to function as effective polymeric surfactants. These materials include a solvent compatible domain and a polyolefin compatible domain. In one example, the polymeric surfactant is a comb polymer. In another example, the polymeric surfactant is a brush polymer.

The polymeric surfactant may have a polyether domain or a plurality of polyether domains. In one example, the polyether domains are polyethylene oxide (PEO), also known as polyethylene glycol (PEG). The polyether domains may be polypropylene oxide (PPO), also known as polypropylene glycol (PPG). Other polyethers may be used. However, the widespread availability of PEG and PPG polymers, their cost advantages over other polyether structures and the relative ease in tailoring the number of repeat units make PEG and PPG good choices when considering polyether domains in the polymeric surfactant.

The polymeric surfactant may have alkyl domain or a plurality of alkyl domains. The alkyl domains are examples of polyolefin compatible domains. The akyl domains may be linear. The akyl domain may include pendent groups. The akyl domain may be pendent alkyl groups.

The polymeric surfactant may have a silicone domain or a plurality of silicone domains. The silicone domain may be a polydimethylsiloxane (PDMS). The silicone domain may be a pure PDMS with no non-methyl, non-oxygen groups attached to the backbone silicon atoms. The silicone domain may be a functionalized silicone. The silicone domain may be a functionalized PDMS. Functionalized silicones may include a functional group, for example, a hydroxy group. The functional group may be directly attached to a backbone silicon atom. The functional group may be spaced from a backbone silicon atom, for example, using a short alkyl chain.

The polymeric surfactant includes a polyolefin compatible domain and a second domain that is soluble in the ink formulation. The domains of the polymeric surfactant may help the polymeric surfactant to reduce the interfacial energy between the ink and a polyolefin surface. Because polyolefin materials tend to reorganize their surfaces over time due to the random motion of the alkyl polymers, the polyolefin compatible domains may be incorporated into the polyolefin substrate over time, increasing the adhesion between the polymeric surfactant and the polyolefin surface.

In one example, the polymeric surfactant has a silicone backbone with pendant ether chains substituted. There may be more than one ether chain substituted per silicon. The either chains may be all the same length or different lengths. The ether chains may be substituted randomly on the silicon chain. The ether chains may be regularly substituted, either on each silicon atom or on every X silicon atoms, for example, every two silicon atoms. In another example, substitutions may be made on the end silicon atoms of the backbone, for example, replacing methyl groups found thereon with a longer chain alkyl group, for example, $C_{14}$. In one example the end silicon atom has a single non-methyl substitution, for instance, dimethyldecaoctane. In a different example, the end silicon atom has a plurality of non-methyl substitutions. The ability to tailor the length and number of the terminal silicon substitutions allows a great deal of control over the HLB of the resulting polymeric surfactant.

In one example, the polymeric surfactant includes a backbone of a first polymer with first and second groups of pendant chains. For example, the polymer may be a polyether, the first group of pendant chains, alkyl groups and the second group of pendant chains silicones. In another example, the pendant chains are randomized by first attaching the pendant groups and then forming the backbone chain. These techniques can also be combined with the end group modification, for example, after forming the backbone chain, to provide additional modification or properties to the polymeric surfactant.

The polymeric surfactant may be a block copolymer. The block copolymer may include one block of two different monomers, wherein each block forms one of the domains of the polymeric surfactant. For example, the polymeric surfactant may be an alkyl group on a polyether, for example, a castor oil-PEG copolymer. The polymeric surfactant may be a fatty alcohol connected to a polyether, for example, cetyl or stearyl alcohol with a PPG substitution. The polymeric surfactant may be a fatty acid with a polyether substitution, for example, oleic acid with a PEG-20 substitution.

The polymeric surfactant may also be a block copolymer with multiple blocks of the monomers. If the alkyl block is represented by A and the ether block is represented by E, the compositions like AEA, EAE, AEAE, $(AE)_n$, $AE_n$, $EA_n$, $A_nEA_n$, $E_nAE_n$, etc. are all within the a contemplated scope of the polymeric surfactant. Thus, brush and comb polymers are explicitly recited but also star polymers, branched polymers, and more complex structures that provide the requisite domains. The functional robustness of comb, brush, and star type polymers may offer benefits in thermally jetted inks where the ink is exposed to boiling temperatures during jetting. Comb, brush, and star polymers may also offer greater entanglement at a given molecular weight.

In one example, one of the domains of the polymeric surfactant is selected from a polymer that is below its $T_g$ at service temperature or forms crystal structures. Such a polymer may provide the desired surface energy medication while in solution but as the solvent evaporates, the polymeric surfactant may self-organize into glassy or crystalline regions with attached connective materials. A similar approach provides much of the functional strength and flexibly of polyether polyurethanes. The crystalline or glassy regions may function as large cross links or anchors (e.g., like the silica in silicone rubbers) while the flexible domains (e.g., alkyl domains) provide flexibility and reduce the rigidity of the resulting deposited material.

The polymeric surfactant may be 0.0001 wt. % to 10 wt. % of the ink. The polymeric surfactant may be 0.1 wt. % to 2 wt. % of the ink. The polymeric surfactant may be 0.1 wt. % to 1 wt. % of the ink. The polymeric surfactant may be 0.2 wt. % to 0.5 wt. % of the ink. These weight percent are in terms of the unfired ink percentages. After some of the solvent has flashed off during ejection and drying, the relative percentage of the remaining components will increase.

In one example, the polymeric surfactant is a polyether siloxane copolymer. For example, the polyether siloxane copolymer may be a Tego® Glide or Foamex product from Evonik Resource Efficiency GmbH. Examples include Glide 410, Glide 432, Glide 440, Glide 450, Glide ZG 400, Foamex 840, or Foamex 842.

Tego® Glide 410 is a 100% active content (that is substantially solvent free) polyether-siloxane copolymer with a viscosity at 25 C of approximately 1850 centipoise (cps). It is soluble in ethanol, tripropylene glycol diacrylate (TPGDA), and butyl acetate. It is insoluble in water and white spirit.

Tego® Glide 432 is a 100% active content, polyether-siloxane copolymer with a viscosity at 25 C of approximately 150 cps. It is soluble in ethanol and butyl acetate. It is insoluble in water, TPGDA, and white spirit.

Tego® Glide 440 is a 100% active content, polyether-siloxane copolymer with a viscosity at 25 C of approximately 400 cps. It is soluble in ethanol, TPGDA, and butyl acetate. It is partially soluble in water, forming a cloudy but stable solution. It is insoluble in white spirit.

Tego® Glide 450 is a 100% active content, polyether-siloxane copolymer with a viscosity at 25 C of approximately 250 cps. It is soluble in ethanol, TPGDA, and butyl acetate. It is partially soluble in water, forming a cloudy but stable solution. It is insoluble in white spirit.

Tego® Glide ZG 400 is a 100% active content, polyether-siloxane copolymer with a viscosity at 25 C of approximately 1000 cps. It is soluble in water, ethanol, TPGDA, and butyl acetate. It is insoluble in white spirit. The listed Tego® Glide formulations have strong flow promotion and slip effect but are not effective antifoaming agents.

Tego® Foamex 840 is a 100% active content, silica-free polyether-siloxane copolymer. It is soluble in ethanol, butyl acetate, and white spirit. It is partially soluble in TPGDA, forming a cloudy but stable solution. It is insoluble in water. It is a strong defoaming agent.

Tego® Foamex 842 is a 60% active content, silica-free polyether-siloxane copolymer. It is provided in dipropylene glycol monomethylether. It is soluble in ethanol, butyl acetate, TPGDA, and white spirit. It is insoluble in water. It is a strong defoaming agent.

The polymeric surfactant may be a polyether modified polydimethylsiloxane. For example, the polymeric surfactant may be a BYK® 333 or BYK® 378 by BYK Additives & Instruments, part of Altana.

BYK® 333 is a polyether modified PDMS. It is supplied with less than 3 wt. % volatiles. It is compatible with solvent based and aqueous inks. It has a density of 1.04 g/ml.

BYK® 378 is a polyether modified PDMS. It is supplied with less than 4 wt. % volatiles. It is compatible with solvent-borne, solvent-free, and aqueous solutions. It has a refractive index of 1,440 and a density of 1.02 g/ml.

The polymeric surfactant may be a water insoluble silicone alkyl polyether. For example, the polymeric surfactant may be a Silube® product from Siltech. Some examples include J208 612 or J208 812. The polymeric surfactant may be a polyether dimethicone, for example, Silube® T308-16.

Silube® J208 612 is a 100% active content silicone alkyl polyether. It is a lauryl PEG-8 dimethicone. It has a density of 1.07 g/ml and a viscosity at 25 C of 500 cps. It has a hydrophilic-lipophilic balance (HLB) of approximately 3-4.

Silube® J208 812 is a 100% active content silicone alkyl polyether. Specifically, it is also a lauryl PEG-8 Dimethicone. It has a density of 1.07 g/ml and a viscosity at 25 C of 300 cps. It has an HLB of approximately 2.

Silube® T308-16 is a 100% active content silicone alkyl polyether. It is a cetyl PEG/PPG-10/1 Dimethicone. It has a density of 0.94 g/ml and a viscosity at 35 C of 1000 cps. It has an HLB of approximately 3.

The Silube® polymers are described by the following general structure.

methacrylate (iBMA) copolymer with an average molecular weight of 56,000 Daltons. It is soluble in white spirit, aromatics, esters, ketones, and isopropanol. The solid has a density of 1.04 g/ml and an acid value of 1. The solid has a volatile content of less than 1.5 wt. % and a $T_g$ of approximately 56 C. It is not water soluble. The isobornyl pendant groups provide one domain and the backbone methacrylate provides the second domain.

The polymeric surfactant may be a glycidyl-functional acrylic crosslinker. The polymeric surfactant may be an acrylic resin. For example, Isocryl® N2513 or N2513G (ground version) from Estron Chemical. These are moderate molecular weight acrylic resins with a $T_g$ of 45-55 C and less than 1.5 wt. % volatiles.

The polymeric surfactant may be a phenolic resin. One example is MB® 7022 from Dianal America which is a low molecular weight iBMA resin. Another example is Reactol® 1111E from Lawter, Inc, Reactol®, 1111 is soluble hydrocarbons, ketones, alcohols, and acetates. It has a melting point of approximately 150 C and is pure phenolic resin. It has a density of 1.07 g/ml and an acid value of approximately 75.

The polymeric surfactant may be a cosolvent soluble polyimide resin. For example, Flex Rez® 1074 from Lawter, Inc. This resin is available as 100% solids with an acid value of no more than 6. It has a melting point of approximately 110 C. It is soluble in propanol, butanol, and aromatic organics.

In some examples, the polymeric surfactant is not water soluble. In another example, the polymeric surfactant may have a little solubility in water, in one example the polymeric surfactant is below 1000 ppm soluble in water. The polymeric surfactant may also function as a dispersant.

SOLVENT: The solvent may be 50 wt. % to 98 wt. % of the ink formulation. The solvent may be 70 wt. % to 90 wt. % of the ink formulation. The solvent may be 75 wt. % to 80 wt. % of the ink formulation.

The polymeric surfactant may be a polymaleic anhydride-1-octadecene. For example, the PA-18® and PA-18LV® products available from Chevron-Phillips. This is a solid material at room temperature with a melting point of approximately 123 C. It contains less than 1.5 wt. % volatiles. In this polymeric surfactant, the backbone includes oxygen containing groups and the octadecane chains are pendant.

The polymeric surfactant may be a suitable nonionic polymer. In one example, the polymeric surfactant is Zephrym® 2206 available from Croda. The polymeric surfactant may be a non-volatile organic compound (VOC) polymeric dispersant. This material is considered particularly effective at dispersing material in low polarity solvents.

The polymeric surfactant may be an acrylic copolymer. For example, a NeoResin® from DSM Coating Resins such as NeoCryl® B-731. NeoCryl® B-731 is a solid isobornyl The solvent may comprise: water, monohydric short chain alcohols, acetone, ethyl acetate, methyl acetate, 1-methoxy-2-propanol, diethylene glycol butyl ether, and/or mixtures thereof. In one implementation, the solvent solution includes approximately 10 wt. % to 20 wt. % of 1-methoxy-2-propanol, 10 wt. % to 85 wt. % monohydric short chain alcohol, and 5 wt. % to 80 wt. % acetone.

The solvent may be a non-aqueous solvent. In one example, the solvent is ethanol. The solvent may be methanol. The solvent may be a mixture of alcohols. The solvent may be a mixture of organic species including non-alcohol organics.

The solvent may be a ketone. In one example, the solvent is acetone. In another example, the solvent is a cyclic ketone. The ketone may include additional oxygen containing groups depending on the solubility requirements for the selected colorants.

The solvent may be a low molecular weight carboxylic acid. In one example, the solvent comprises a carboxylic acid selected from: formic acid, acetic acid, propionic acid, butyric acid, and mixtures thereof. The carboxylic acid may be neutralized in solution to reduce damage to the substrate and/or printhead.

The solvent may be a low molecular weight organic. In one example, the solvent includes a liquid, linear alkane such as octane or nonane. The solvent is a liquid at room temperature but can be transitioned to a gas by a thermal resister in an inkjet. The use of an alkane or similar liquid may enhance deposition into a polyolefin film. Alkanes also have relatively low surface energy, improving spreading on polyolefin surfaces compared with, for example, water or ethanol.

The ink may be substantially water free. For example, the ink may have a water concentration of no more than 1 wt. %. The ink may have a water concentration of no more than 0.5 wt. %. The ink may have a water concentration of no more than 1000 ppm. The ink may have a water concentration of no more than 200 ppm.

COSOLVENTS: The ink may include a cosolvent. Any of the solvents described above may be used as a cosolvent. The cosolvent may be a ketone. The cosolvent may be 5 wt, % to 20 wt. % of the ink. The cosolvent may be 5 wt. % to 10 wt. % of the ink. Some suitable ketones include acetone and cyclohexanone. The ink may include a plurality of cosolvents. In one example, the ink comprises 5 wt. % to 10 wt. % acetone and 5 wt. % to 10 wt. % cyclohexanone. The ketone cosolvent(s) may collectively comprise 14 wt. % to 16 wt. % of the ink.

PERFLUOROPOLYETHER: Previous disclosures by this inventor have discussed the benefits of perfluoropolyethers in inkjet ink formulations. The inclusion of perfluoropolyether increases decap time. See, e.g., U.S. Pat. No. 9,017,467, incorporated by reference into this application. In one example, the perfluoropolyether is Fluorolin® A10 available from Solvay Solexis.

COLORANT: The ink contains a colorant. The colorant may include a dye or a plurality of dyes. The colorant may include a pigment or a plurality of pigments. The colorant may be soluble in the solvent. The colorant may be soluble in a cosolvent. In one example, the colorant includes an alcohol soluble dye and a ketone soluble dye.

The use of multiple dyes in the ink formulation may provide benefits over the use of a single dye. Multiple dyes may provide superior performance at a lower cost. Multiple dyes may allow brighter or more robust colors compared with single dye. Multiple dyes may allow better tuning of secondary properties like gloss in the printed ink. However, the use of multiple dyes may provide additional challenges in formulation of the ink. Multiple dyes may use of a cosolvent to obtain the desired dye concentrations. Multiple dyes may introduce more incompatibilities for the ink formulation, narrow acceptable storage conditions, or limit process ranges.

Examples of suitable dyes include the Sudan® dyes available from BASF, such as: Sudan® Blue 670, C.I. Solvent Blue 35; Sudan® Black X60; and Sudan® Orange 220. Other suitable dyes, depending on solvents and cosolvents, include Oil Blue N, C.I. Solvent Blue 14 available from Aldrich Chemical Company, Inc., Oil Brown 102 available from Passaic Color & Chemical Company; Oil Red 234 available from Passaic Color & Chemical Company; C.I. Solvent Blue 48 available from Ciba-Geigy; Oracet® Pink RF, C.I. Pigment Red 181 available from Ciba-Geigy; Orasol® Black RL, C.I. Solvent Black 29 available from Ciba-Geigy; Orasol Red G, C.I. Solvent Red 125 available from Ciba-Geigy; Orasol Yellow 2GLN, C.I. Solvent Yellow 88 available from Ciba-Geigy; Savinyl® Blue GLS, C.I. Solvent Blue 44 available from Sandoz Chemicals; Savinyl® Fire Red 3GLS PAT, C.I. Solvent Red 124 available from Sandoz Chemicals; and Savinyl® Yellow RLS, C.I. Solvent Yellow 83:1. The Orasol® family of dyes from BASF including Black X55 and Orange 247, and the Valifast® family of dyes including Valifast Black 3808, C.I. Solvent Black 29 from Oriental Chemical Company, Ltd have also been found to perform well.

Further, depending on the particular solvent and cosolvents used, solvent soluble dyes may be used; for example, those below described using Color Index (C.I.) Generic Names. Black solvent dyes may include C.I. Solvent Black 5, 7, 27, 28, 29, 34, 35, 45, 46, and 48. Blue solvent dyes may include C.I. Solvent Blue 4, 5, 6, 35, 38, 48, 59, 67, 70, 104, and 136. Violet solvent dyes may include C.I. Solvent Violet 8, 9, 11, 14, and 38. Brown solvent dyes may include C.I. Solvent Brown 1 3, 5, 20, 42, 43, 44, 48 and 52. Orange solvent dyes may include C.I. Solvent Orange 3, 11, 20, 25, 54, 60, 62, 63, 86, 99, and 105. Red solvent dyes may include C.I. Solvent Red 1, 23, 29, 49, 119, 122, 125, 127, 130, 132, 135, 149, 160, 164, 168, 169, 172 and 233, Yellow solvent dyes may include C.I. Solvent Yellow 10, 13, 14, 19, 25, 28, 33, 88, 89, 114, 146 and 163. Dyes may be used in individually or in combination with other dyes, pigments, and/or other colorants. The colorant may constitute from 2 wt. % to 10 wt. % of the ink. In one example, a plurality of dyes constitute from 4 wt. % to 7 wt. % of the ink.

ANTI-KOGATION AGENT: The ink may include the anti-kogation agent. Kogation refers to the deposit of dried ink on a heating element of a thermal inkjet (TIJ) printhead. Anti-kogation agent(s) is/are included to assist in preventing the buildup of kogation. Examples of suitable anti-kogation agents include oleth-3-phosphate (commercially available as CRODAFOS® O3A or CRODAFOS® N-3 acid from Croda Int.) or dextran 500k. Other examples of the anti-kogation agents include CRODAFOS® HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the inkjet ink in an amount ranging from about 0.05 wt. % to about 2 wt. % of the ink.

BIOCIDE: When a biocide is utilized, a suitable amount of the biocide may range from about 0.05 wt. % to about 0.5 wt. % of the ink. The upper limit for the biocide(s) may depend upon the type of biocide and its toxicological effect and/or regulatory requirements. For example, the upper limit for PROXEL® GXL (Arch Chemicals, Inc., Norwalk, Conn.) is 0.2 wt. %. Other biocides include, for example, PROXEL® GXL, KORDEK® MLX (The Dow Chemical Co.), and/or BIOBAN® CS-1246 (The Dow Chemical Co.). NUOSEPT® 95, available from Huls America (Piscataway, N.J.); PROXEL® GXL, available from ICI Americas (Wilmington, Del.); and glutaraldehyde, available from Union Carbide Company (Bound Brook, N.J.) under the trade designation UCARCIDE® 250.

One formulation of an ink consistent with the present disclosure is described below. This formulation includes two ketone cosolvents, perfluoropolyether, and the polymeric surfactant in an ethanol solvent.

Formula 1:

| Role | Component | Wt. % of ink |
| --- | --- | --- |
| Solvent | ethanol (pure) | 77 |
| Cosolvent | cyclohexanone | 9 |
| Cosolvent | acetone | 6 |
| Colorant | Valifast ® Black 3808 | 5 |
| Colorant | Orasol ® Orange 247 | 1 |
| Adhesion | Neocryl ® B-818 | 1.8 |
| Decap | Fluorolin ® A10 | 0.3 |
| Emulsifier | Cordafos ® T6A | 0.2 |

This formulation was compared with a control formulation without the polymeric surfactant. In the control, the weight percentage of each component is scaled by the inverse of the wt. % of the polymeric surfactant. Formula 1 was compared with formula 1 spiked with different polymeric surfactants.

The spreading results were assessed optically using microscopy. The inclusion of a polymeric surfactant was found visibly to increase wetting. The droplets of deposited ink remained roughly circular and of uniform size. In contrast, when the polymeric surfactant was not present, the droplets on a polyolefin surface tended coalesce into larger droplets. This resulting poor image quality. Coalescence also resulted in uneven thicknesses of ink, which in turn caused color intensity variation in the printed ink.

The various formulations and the control were also assessed by measuring the normalized optical density (KOD) of a test pattern of the printed ink. This measurement corrects for the background and assesses the uniformity of the ink appearance with higher values representing better appearance and uniformity in the printed material.

| Polymeric Surfactant | KOD | Coalescence |
| --- | --- | --- |
| Control (none) | 0.06 | Complete |
| Control + 0.5 wt. % Tego ® Glide ZG400 | 0.15 | Some |
| Control + 0.5 wt. % Tego ® Glide 432 | 0.29 | Minimal |
| Control + 0.5 wt. % Tego ® Foamex 842 | 0.38 | Minimal |
| Control + 0.5 wt. % Tego ® Foamex 840 | 0.56 | None |

The Tego® Foamex 842 is provided as a 60 wt. % formulation in dipropylene glycol monomethylether. Accordingly, the inclusion of 0.5 wt. % Tego® Foamex 842 includes 0.3 wt. % of the polymeric surfactant and 0.2 wt. % of the solvent. In contrast, the Tego® Fomex 840 is provided without solvent and so the 0.5 wt. % corresponds to 0.5 wt. %. This may explain the increased KOD and decreased Coalescence in the Tego® Foamex 840 over the Tego® Foamex 842. The Tego® Foamex 842 also appears to have lower molecular weight polymeric surfactant which implies a greater number of molecules in a given weight as well as greater mobility and less entanglement. This may explain the advantage in print quality between the Tego® 840 and 842.

This is consistent with the results from the Tego® Glide formulations where shorter chains of the Tego® Glide 432 (cps 150) had higher KOD and better print quality than the larger chains of the Tego® Glide ZG400 (1000 cps). Accordingly, the use of smaller molecules with appropriate domains may increase print quality and KOD. This may be due to the relatively short time periods between deposition and fixation of the ink on the substrate. In short time frames, the mobility of the active species may be regulator of their effectiveness. Similarly, increasing concentration increases the concentration of the active species on the surface, with the benefits of increasing concentration in the bulk solution dependent upon when the surface becomes effectively saturated.

In addition to producing poor print quality and poor character definition, the coalescence of the droplets also increases the drying time of the ink. This is a consequence of having thicker areas of coalesced ink which in turn take a longer time to dry to a tack free condition. In contrast, if the ink is spread in a thinner layer over a larger area, the drying time is reduced. Long drying times may slow the system printing rate. Long drying times may increase system cost by the inclusion of an additional heater or path to handle the printed material while drying and before placing the next sheet of media on the drying ink.

The addition of a polymeric surfactants to ink may decrease decap times, reduce mechanical rub durability, and reduce optical density of the ink. These factors are balanced against the print quality and other benefits provided by the polymeric surfactant.

Figure 1A:
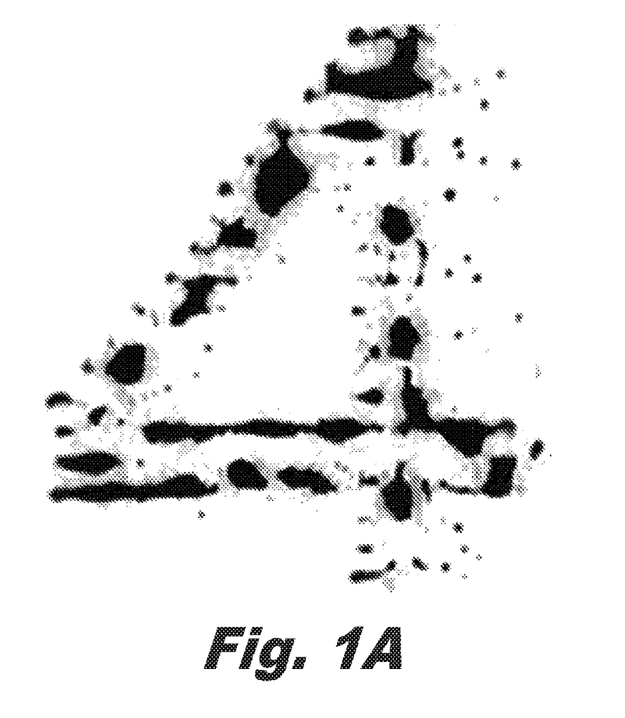
FIGS. 1A and 1B show magnified images of a number 4 printed on untreated BOPP at 300×300 dots per inch (DPI) using a control ink (FIG. 1A) and an ink with a polymeric surfactant (FIG. 1B).
Figure 1B:
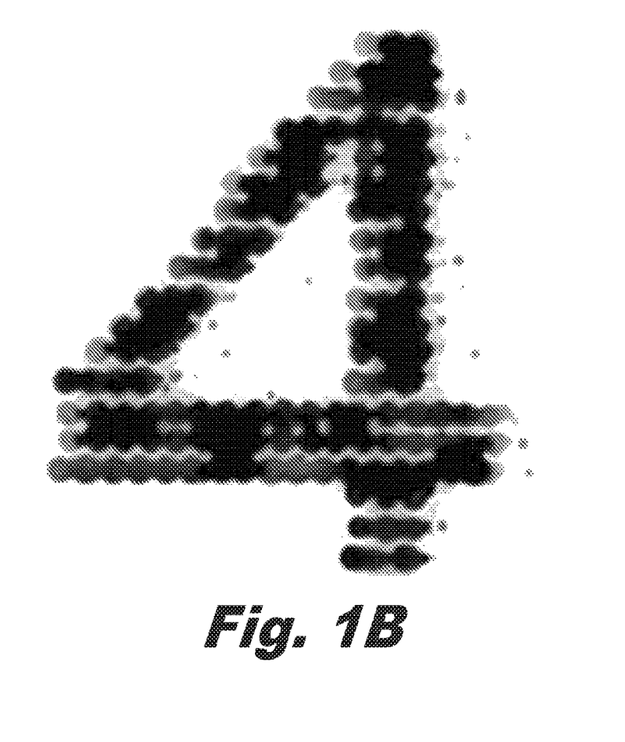

FIGS. 1A and 1B show magnified images of a number 4 printed on untreated BOPP at 300×300 dots per inch (DPI) using a control ink (FIG. 1A) and an ink with a polymeric surfactant (FIG. 1B). In FIG. 1A; the control ink of formula 1 has been used. The droplets show clear consolidation. For example; the ink is clustered at the edges of the printed areas with almost no ink remaining in the middle of the printed portions. In contrast, FIG. 1B shows the same image printed on the same substrate; however; the ink has been spiked with 0.2 wt. % Silube® J802-812. In FIG. 1B, the individual droplets are visible. Some of the adjacent droplets have linked by the ink has not flowed out of a droplet leaving the area bare as in FIG. 1A.

Figure 2:
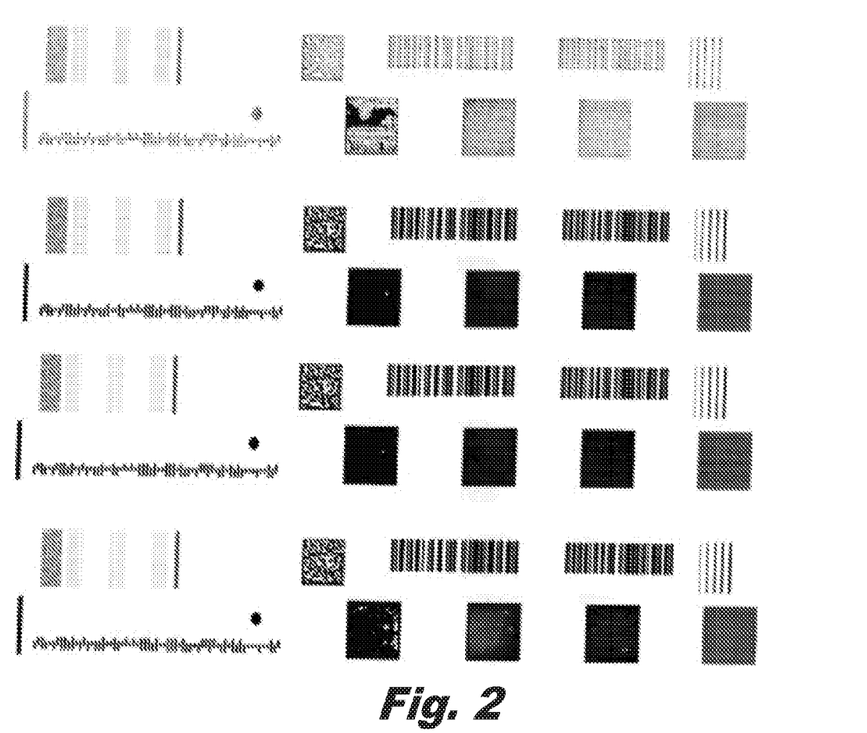
FIG. 2 shows images of test patterns for a set of formulations including a control ink test pattern at the top and three polymeric surfactant spiked ink formulations below.

FIG. 2 shows images of test patterns for a set of formulations including a control ink test pattern at the top and three polymeric surfactant spiked ink formulations below.

The four formulations from top to bottom are described in the table below:

| Polymeric Surfactant | Ink Uniformity | Coalescence |
| --- | --- | --- |
| Control (none) | Poor | Complete |
| Control + 0.5 wt. % polymaleic anhydride-1-octadecene | Good | Minimal |
| Control + 0.5 wt. % polymaleic anhydride-1-octadecene + 0.4 wt. % Silube ® J208 812 | Excellent | None |
| Control + 0.5 wt. % polymaleic anhydride-1-octadecene and 0.5 wt. % Siltech ® F-20 | Moderate | Some |

Ink uniformity and coalescence can be visually assessed by looking at the square test patterns. For the control ink at the top, the coalescence of the ink and lightness of the printing generally indicate poor spreading by the ink. The $2^{nd}$ sample down contains 0.5 wt. %. 5% polymaleic anhydride-1-octadecene added to the control. There is a small amount of coalescence visible in the test squares. The $3^{rd}$ sample contains 0.5 wt. % polymaleic anhydride-1-octadecene+0.4% wt. Silube J208 812. The third sample has the best performance of these four samples. The test squares are uniform in color without signs of coalescence on the polyolefin (BOPP) substrate. The bottom, 4th sample had both 0.5% polymaleic anhydride-1-octadecene and 0.5% Siltech F-20. The test squares show some coalescence and the ink darkness is lighter than the second and third samples.

Based on these test results, the use of multiple polymer surfactants may provide increased wetting over single polymer surfactant formulations. However, as seen in sample 4, this is not always the case.

It will be appreciated that, within the principles described by this specification, a vast number of variations exist. It should also be appreciated that the examples described are only examples, and are not intended to limit the scope, applicability, or construction of the claims in any way.

What is claimed is:

1. An inkjet ink comprising:
    a solvent;
    a plurality of ketone cosolvents, wherein the plurality of ketone cosolvents comprise a cyclic ketone;
    a solvent-soluble dye;
    0.1 wt. % to 1 wt. % of the ink of a perfluoropolyether; and
    0.1 wt. % to 2 wt. % of the ink of a polymeric surfactant, wherein the polymeric surfactant comprises an alkyl domain, wherein the polymeric surfactant is a liquid at 25° C. with a viscosity of no more than 750 centipoise (cps); and wherein the polymeric surfactant is selected from the group consisting of polyether dimethicone, polymaleic anhydride-alkene, glycidyl-functional acrylic crosslinker, polyether siloxane copolymer, and mixtures thereof.

2. The ink of claim 1, wherein the polymeric surfactant comprises 0.2 wt. % to 0.5 wt. % of the ink.

3. The ink of claim 1, wherein ink comprises less than 1 wt. % water.

4. The ink of claim 1, wherein the solvent is an alcohol.

5. The ink of claim 1, wherein the solvent comprises ethanol.

6. The ink of claim 1, wherein the polymeric surfactant is insoluble in water.

7. The ink of claim 1, wherein the polymeric surfactant is a polyether dimethicone.

8. The ink of claim 1, wherein the polymeric surfactant is a polymaleic anhydride-alkene.

9. The ink of claim 1, wherein the polymeric surfactant is a glycidyl-functional acrylic crosslinker.

10. The ink of claim 1, wherein the polymeric surfactant is selected from a group comprising: an acrylic resin, an acrylic copolymer, a phenolic resin, and a polyamide resin.

11. The ink of claim 1, wherein:
    the solvent comprising 50 wt. % to 98 wt. % of the ink of an alcohol solvent;
    the dye comprising a dye soluble in the alcohol solvent; and
    wherein the ink comprises no more than 1 wt. % water.

12. A method of printing with the ink of claim 1, the method comprising printing onto a polyolefin surface by depositing the ink onto a polyolefin surface.

13. The ink of claim 1, wherein the ketone cosolvents comprise cyclohexanone and acetone.

14. The ink of claim 1, wherein the polymeric surfactant is a mixture of polymaleic anhydride octadecene and lauryl PEG-8 dimethicone.

15. The ink of claim 1, wherein the polymeric surfactant is 0.4 wt. % to 0.6 wt. % of the ink of a polyether siloxane copolymer.

16. An inkjet ink comprising:
    a solvent, the solvent comprising 50 wt. % to 98 wt. % of the ink of an alcohol solvent;
    a plurality of ketone cosolvents comprising 5 wt. % to 25 wt. % of the ink; a solvent-soluble dye, the dye comprising a dye soluble in the alcohol solvent;
    0.1 wt. % to 1 wt. % of the ink of a perfluoropolyether; and
    0.1 wt. % to 2 wt. % of the ink of a polymeric surfactant, wherein the polymeric surfactant comprises an alkyl domain,
    wherein the ink comprises no more than 1 wt. % water, wherein the polymeric surfactant is a liquid at 25° C. with a viscosity of no more than 750 centipoise (cps); and
    wherein the polymeric surfactant is selected from the group consisting of polyether dimethicone, polymaleic anhydride-alkene, glycidyl-functional acrylic crosslinker, polyether siloxane copolymer, and mixtures thereof.

17. The ink of claim 16, wherein the plurality of ketone cosolvents comprise acetone and cyclohexanone.

18. The ink of claim 16, wherein the plurality of ketone cosolvents comprise 14 to 16 wt. % of the ink.

* * * * *